(No Model.) 13 Sheets—Sheet 1.

L. H. GRIESER.
GRAIN BINDER.

No. 468,295. Patented Feb. 2, 1892.

Fig. 1.

WITNESSES:
F. L. Ourand
Jno. Enders Jr.

INVENTOR:
Louis H. Grieser,
by Saus Dagger & Co.
Attorneys.

(No Model.)
13 Sheets—Sheet 3.

L. H. GRIESER.
GRAIN BINDER.

No. 468,295. Patented Feb. 2, 1892.

WITNESSES:
F. L. Ourand
Jno. Enders Jr

INVENTOR:
Louis H. Grieser,
by Staus Dagger & Co
Attorneys (No Model.)

L. H. GRIESER.
GRAIN BINDER.

No. 468,295. Patented Feb. 2, 1892.

WITNESSES:
F. L. Durand
Jno. Enders Jr.

INVENTOR:
Louis H. Grieser
by Sam'l Dagger & Co.
Attorneys.

(No Model.)  13 Sheets—Sheet 5.
L. H. GRIESER.
GRAIN BINDER.

No. 468,295.  Patented Feb. 2, 1892.

Fig. 7.

WITNESSES:
F. L. Durand
Jno. Enders Jr.

INVENTOR:
Louis H. Grieser,
by Louis Bagger & Co.
Attorneys.

(No Model.) 13 Sheets—Sheet 6.

L. H. GRIESER.
GRAIN BINDER.

No. 468,295. Patented Feb. 2, 1892.

WITNESSES:
F. L. Ourand
Jno. Enders

INVENTOR:
Louis H. Grieser
by James Sagger &Co.
Attorneys.

(No Model.) 13 Sheets—Sheet 7.

L. H. GRIESER.
GRAIN BINDER.

No. 468,295. Patented Feb. 2, 1892.

Fig. 9.

WITNESSES:
F. L. Ourand
Jno. Enders Jr

INVENTOR:
Louis H. Grieser,
by James Sagger & Co.
Attorneys (No Model.)                      13 Sheets—Sheet 8.

L. H. GRIESER.
GRAIN BINDER.

No. 468,295.  Patented Feb. 2, 1892.

WITNESSES:  
F. L. Durand  
Jno. Enders Jr.

INVENTOR:  
Louis H. Grieser,  
by James Sagger & Co.  
Attorneys.

(No Model.) 13 Sheets—Sheet 11.
L. H. GRIESER.
GRAIN BINDER.

No. 468,295. Patented Feb. 2, 1892.

(No Model.)

L. H. GRIESER.
GRAIN BINDER.

No. 468,295.

Patented Feb. 2, 1892.

Fig. 17.

WITNESSES:
F. L. Durand
Jno. Enders Jr.

INVENTOR:
Louis H. Grieser,
by Sans Jagger & Co
Attorneys.

UNITED STATES PATENT OFFICE.

LOUIS H. GRIESER, OF DULUTH, MINNESOTA, ASSIGNOR OF ONE-HALF TO NICHLAUS A. FLEISCHER, OF SAME PLACE.

GRAIN-BINDER.

SPECIFICATION forming part of Letters Patent No. 468,295, dated February 2, 1892.

Application filed May 1, 1891. Serial No. 391,208. (No model.)

*To all whom it may concern:*

Be it known that I, LOUIS H. GRIESER, a citizen of the United States, and a resident of Duluth, in the county of St. Louis and State of Minnesota, have invented certain new and useful Improvements in Grain-Binders; and I do hereby declare that the following is a full, clear, and exact description of the invention, which will enable others skilled in the art to which it appertains to make and use the same, reference being had to the accompanying drawings, which form a part of this specification.

My invention relates to improvements in grain-binder attachments for harvesting machines or reapers, the object being to dispense with the wire or twine usually employed to bind the gavels.

The invention, broadly stated, consists in the method, hereinafter described, of binding grain by first forming a bundle or sheaf, compressing it unequally at intervals, then successively taking a number of strands from the periphery of said sheaf, twisting said strands together and laying them down at an angle to the length of the sheaf, forming, as it were, a rope encircling the sheaf, and then tucking the last-formed strand thereof under the previously-twisted strands for the purpose of holding the same, as will hereinafter more fully appear.

The invention also consists in the novel construction and combination of parts hereinafter fully described, and specifically pointed out in the claims.

In the accompanying drawings, Fig. 15 is a detail view of the twister. Fig. 16 is a similar view of the tucker. Figs. $16^a$ and $16^b$ are detail views of the end of the tucker. Fig. 19 is a perspective view of the cogged segment and its intermeshing cog-wheel.

Figure 1:
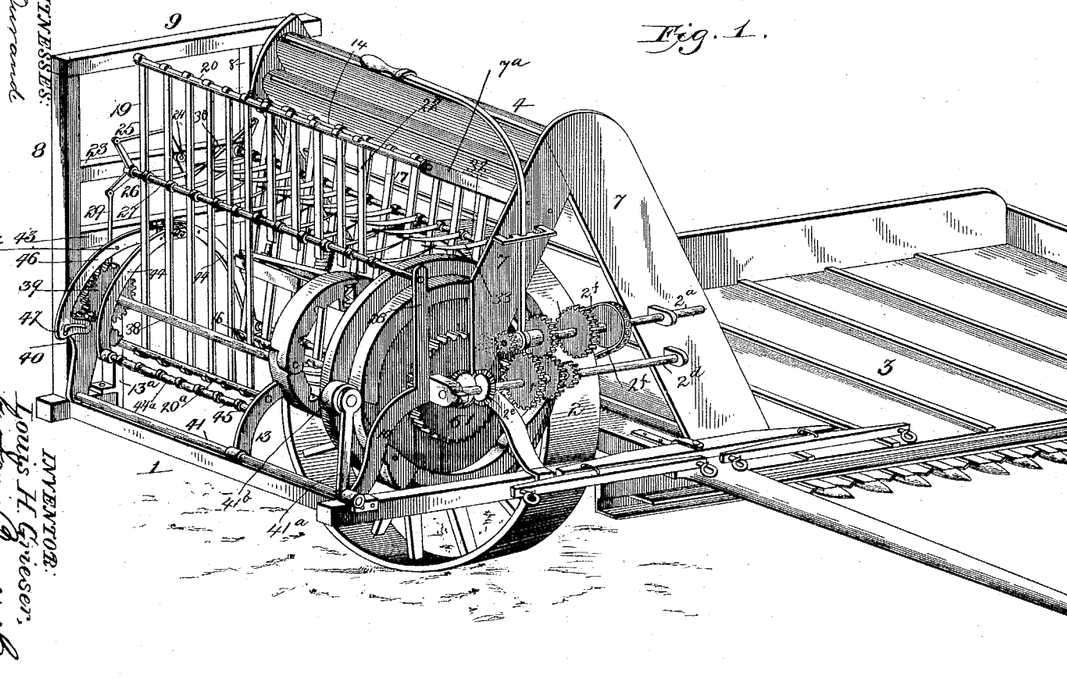
Figure 1 is a perspective view of a portion of a harvester or reaper embodying my invention.
Figure 2:
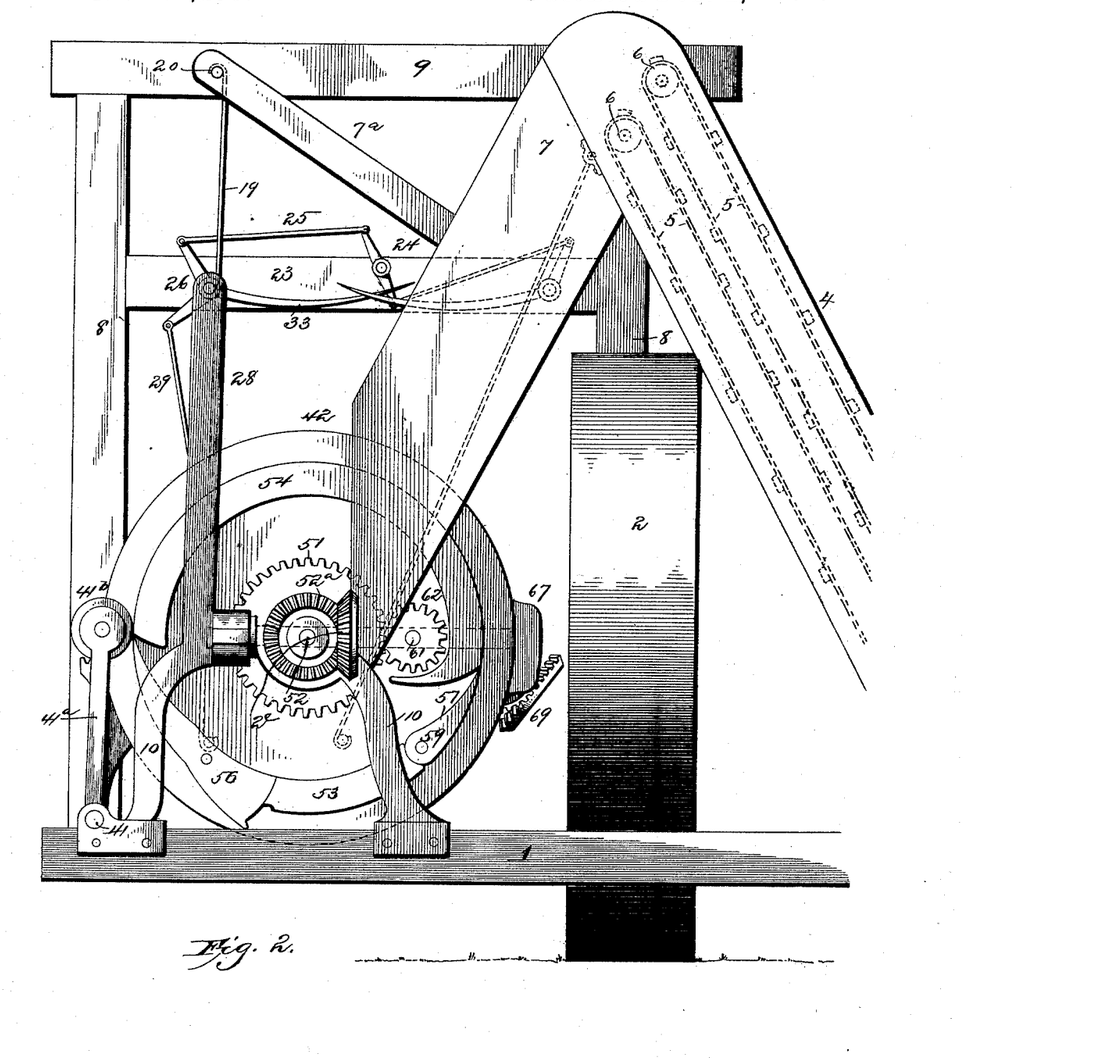
Fig. 2 is a front view of the same.
Figure 3:
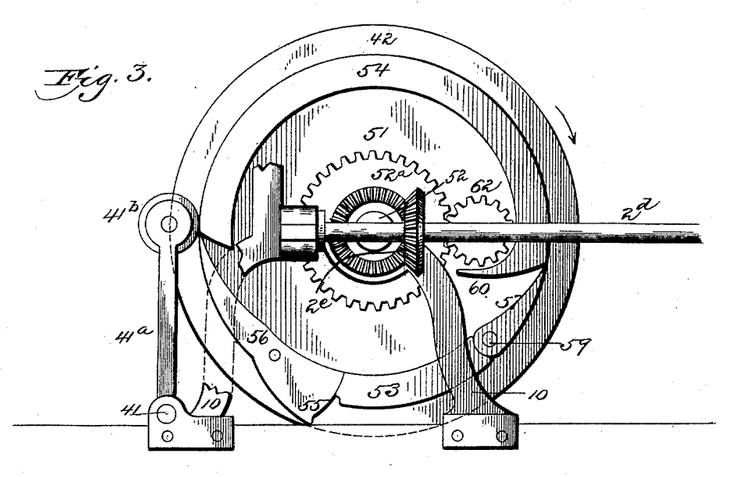
Figs. 3, 4, 5, and 6 are front views of the binder-actuating mechanism, respectively, showing different positions of the parts.
Figure 6:
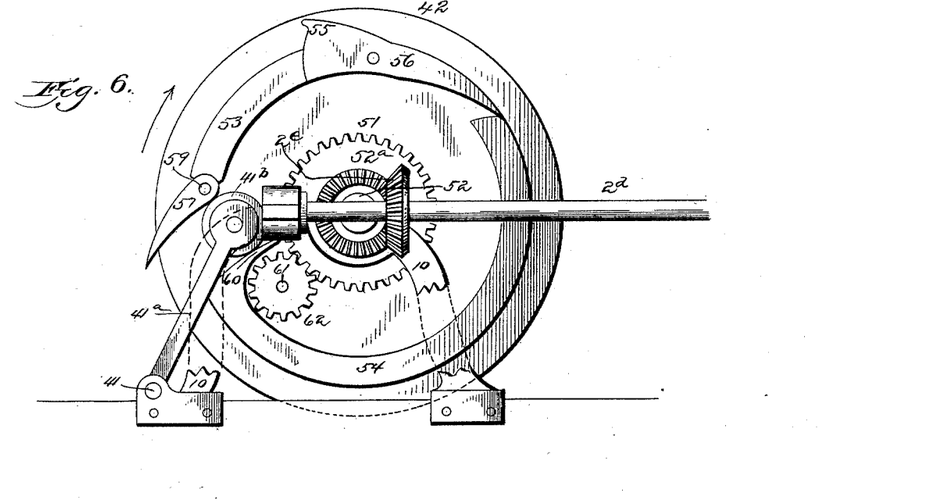
Figure 7:
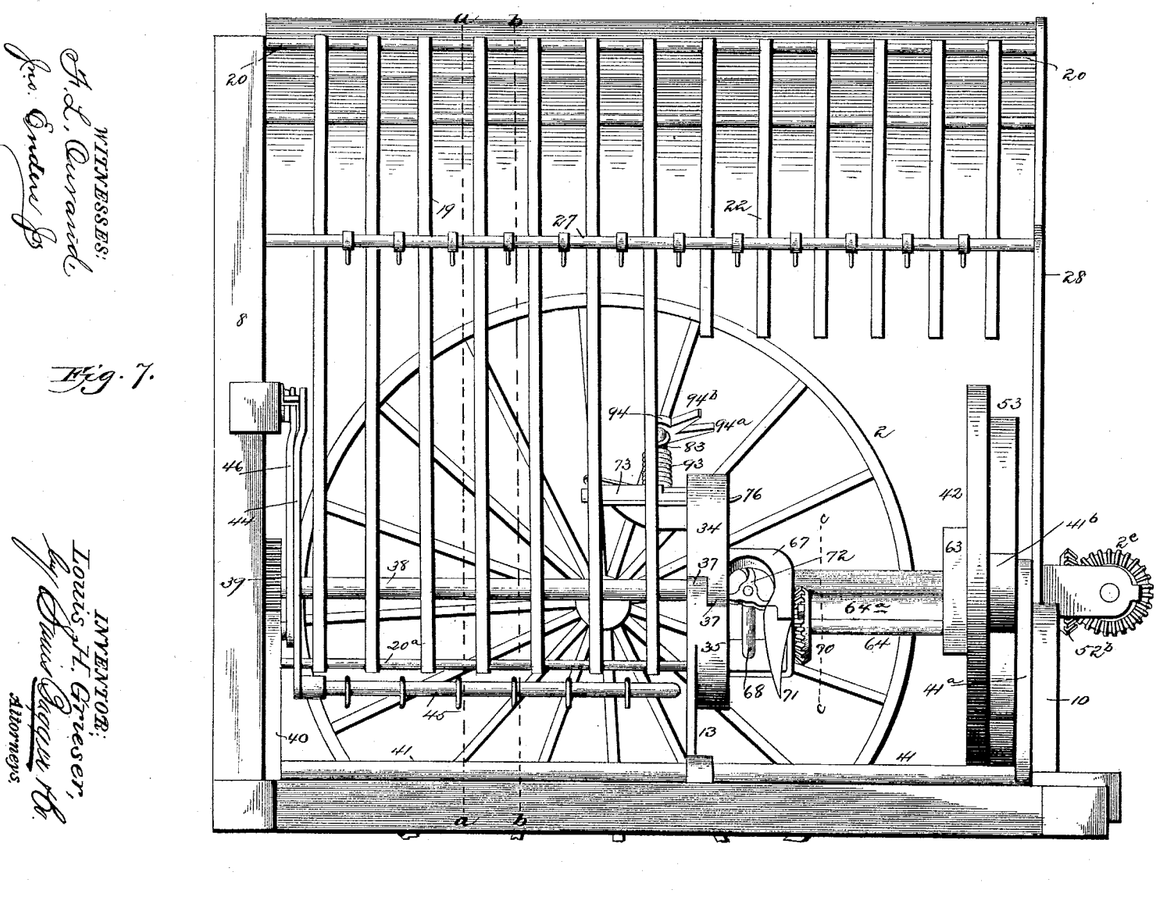
Fig. 7 is a side view of the binding mechanism looking from the off side.
Figure 8:
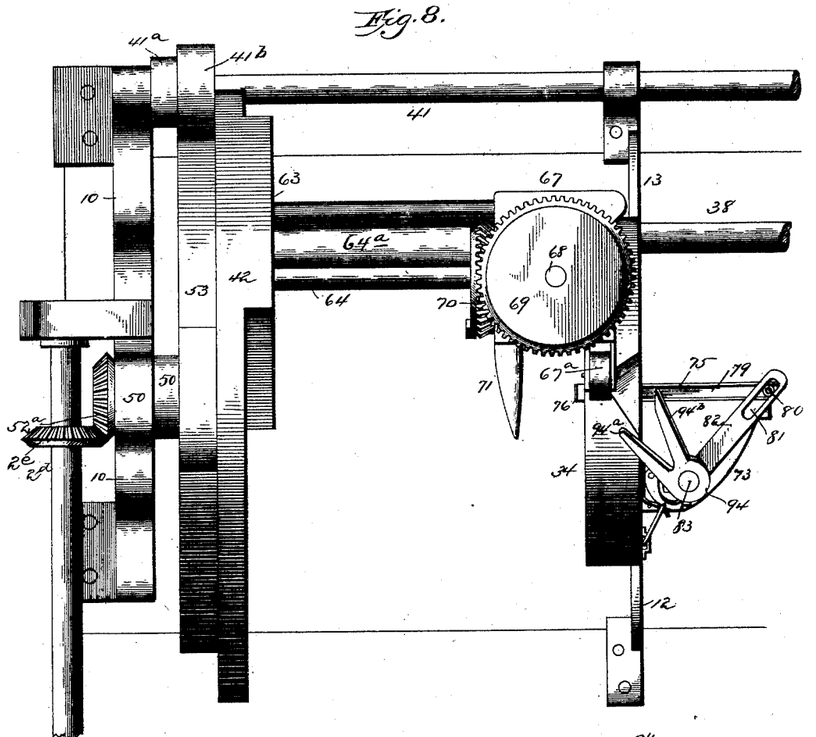
Fig. 8 is plan view of the front part or half of the binding mechanism.
Figure 9:
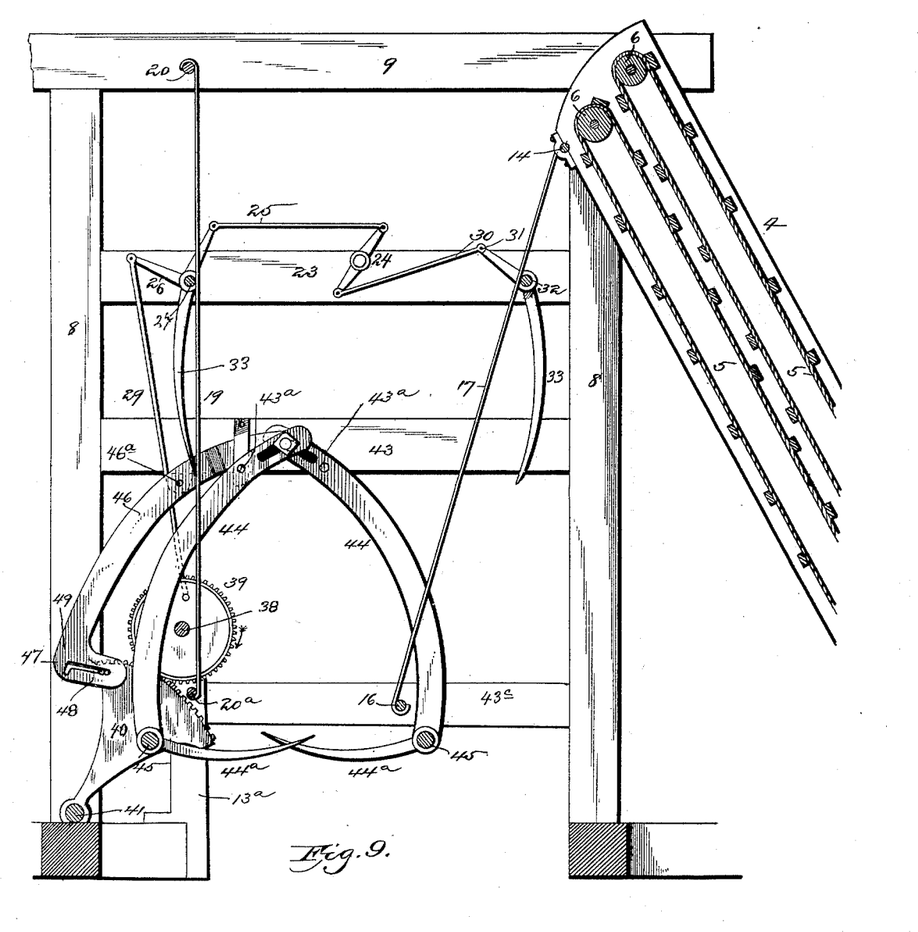
Fig. 9 is a cross-section on the line $a$, Fig. 7, looking toward the rear.
Figures 10, 18:
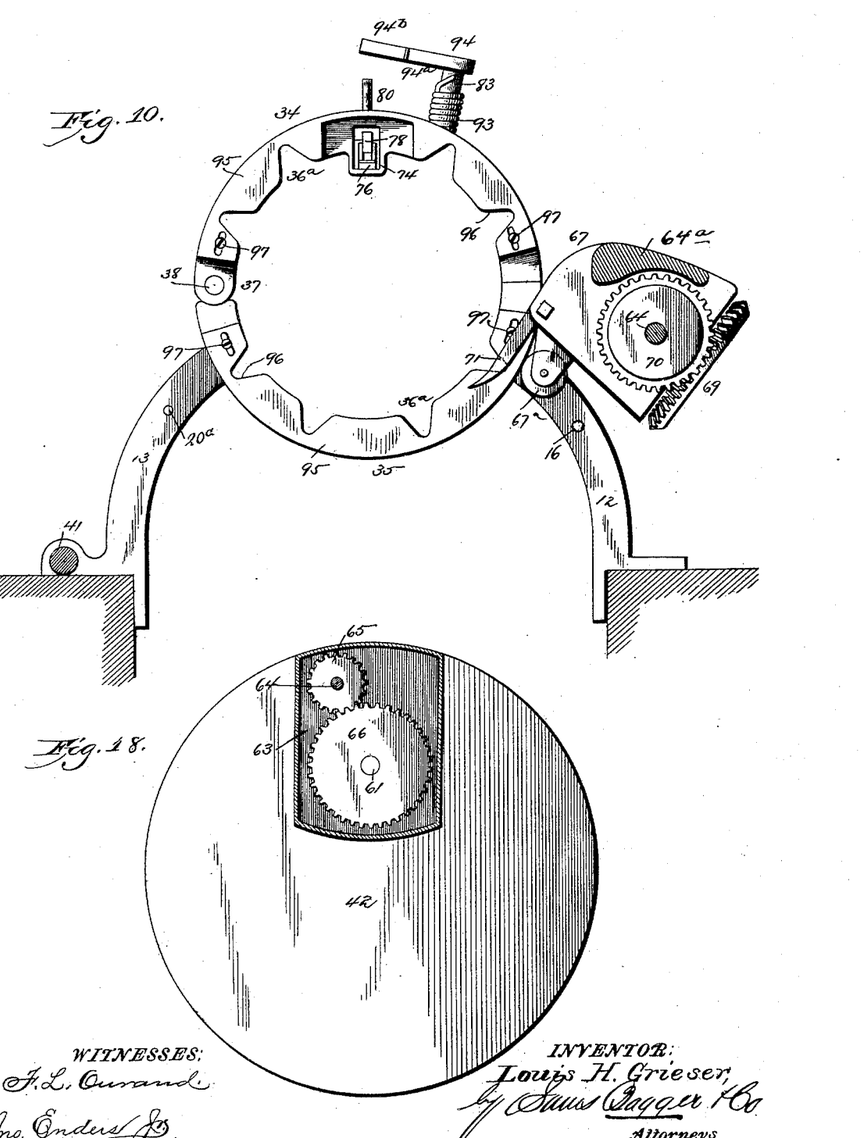
Fig. 10 is a detail sectional view, the packer being shown closed and the parts in this figure corresponding with those shown in Fig. 3, the section being taken on the line $c\ c$, Fig. 7.
Fig. 18 is a rear view of the binder-driving wheel, showing the housing in sections.
Figure 11:
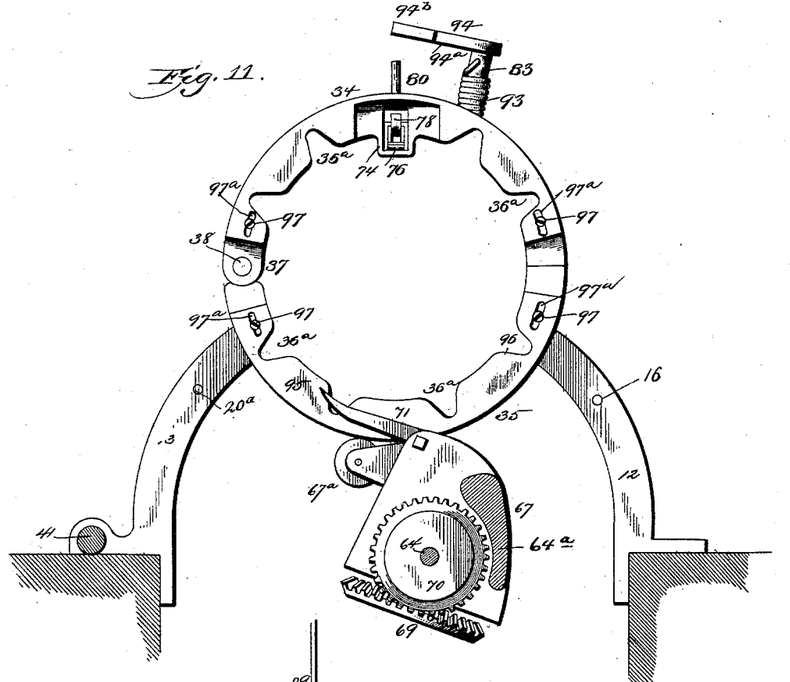
Fig. 11 is a similar view, the positions of the parts in this figure corresponding with Fig. 4.
Figure 12:
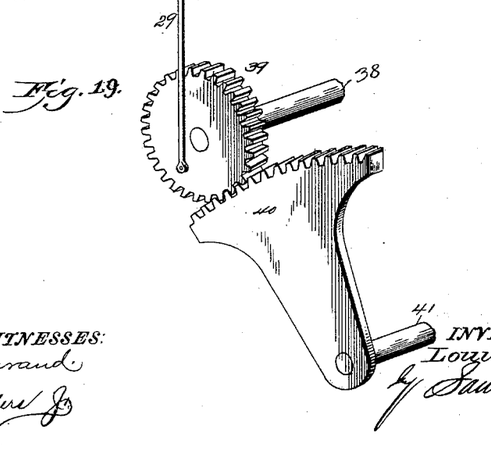
Fig. 12 is a similar view, the packer being opened, this figure corresponding with Fig. 5.
Figures 13, 14:
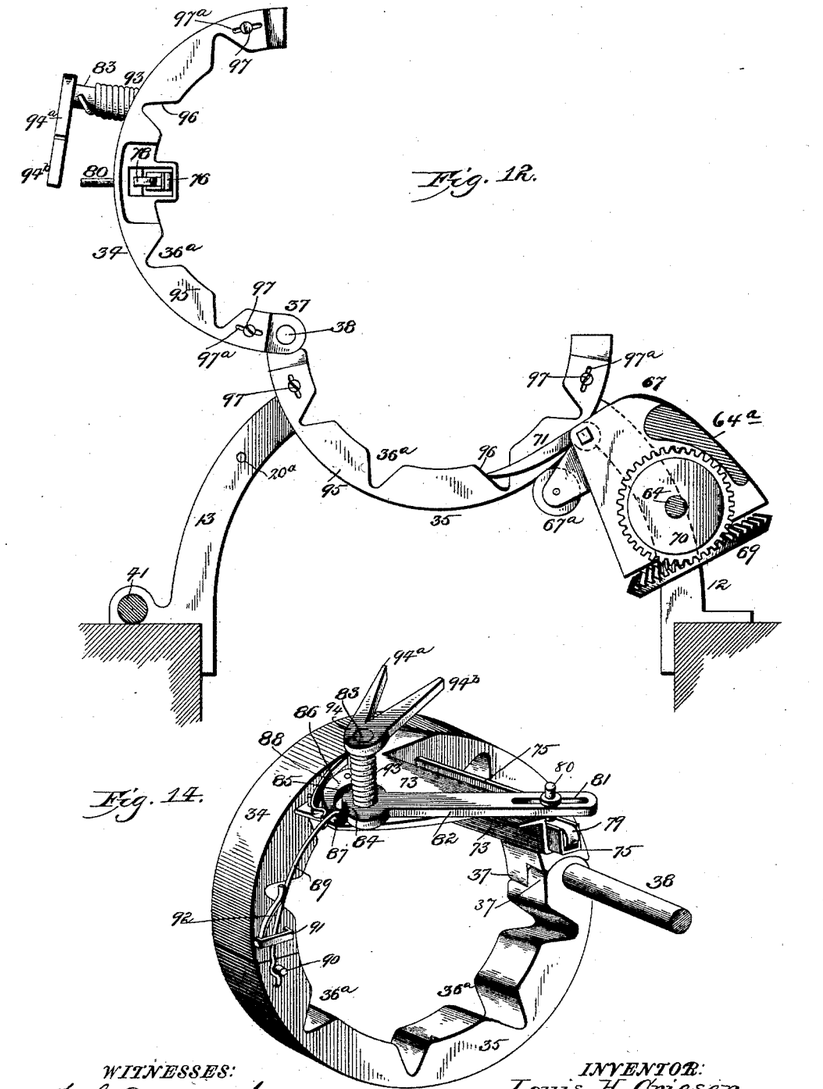
Fig. 13 is a similar view corresponding with Fig. 6.
Fig. 14 is a perspective view of the packer looking from the rear.
Figure 13:
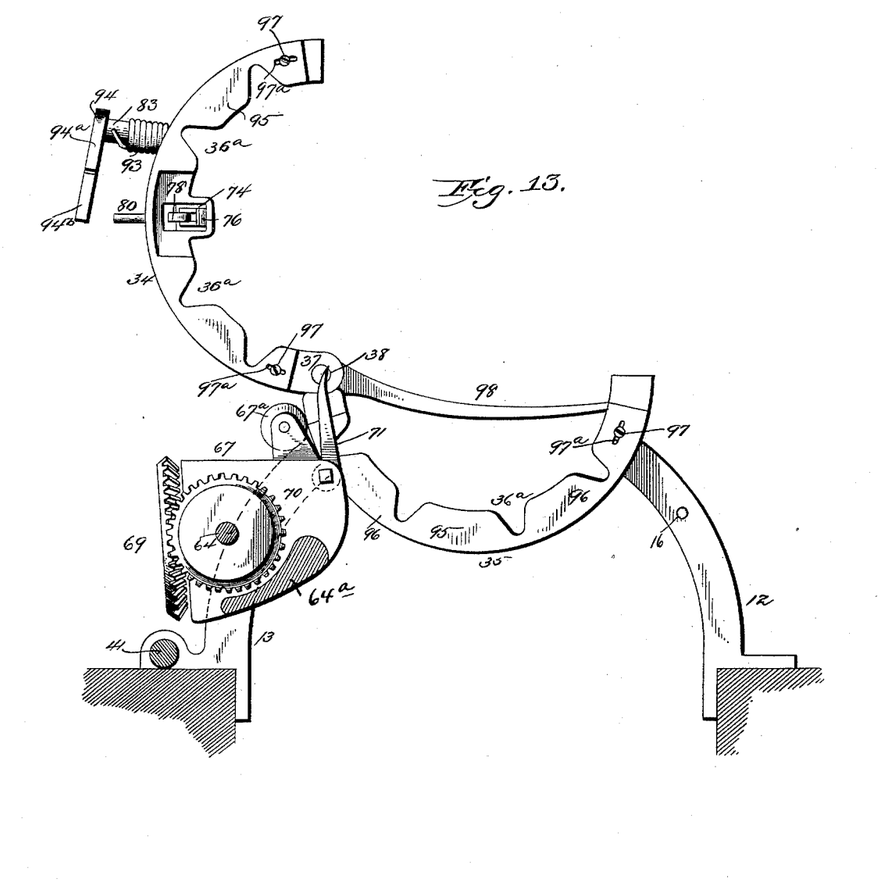

It will be noted that the binder-driving wheel and the packer are shown as not being in exact proportion to each other in some of the above figures. For instance, if the binder-driving wheel in Figs. 3, 4, 5, 6, and 18 were drawn in proportion to the packer shown in Figs. 10, 11, 12, 13, and 14 it would have to be much larger, which would necessitate additional sheets of drawings, without any material benefit resulting therefrom. The proper relative proportions of the said packer and wheel are shown in Figs. 1, 7, and 8.

In the said drawings I have illustrated my invention as employed in connection with what is known as a "single-wheel central-draft" harvester or reaper, although it may be used with any of the ordinary machines in use.

The numeral 1 designates the frame of the machine, 2 the supporting and driving wheel connected by means of a sprocket-chain $2^f$ with a shaft $2^a$, having a number of longitudinally-movable cog-wheels $2^b$, which mesh with a corresponding series of fixed wheels $2^c$ on shaft $2^d$, connected by means of a bevel-pinion $2^e$ with a similar pinion on the shaft of the binder-driving wheel, forming a differential gear by which the speed of said wheel can be varied.

The numeral 3 denotes the platform which carries the grain as it is cut to the elevator 4, consisting of endless aprons 5, passing over rollers 6 in the upper and lower ends of the inclined supports 7, (the lower rollers not being shown.) These parts may be of any desired construction, they not forming any part of the present invention.

The numeral 8 designates two uprights or standards secured to the rear of the binder-frame, which is located on the opposite side of the machine to the grain-platform, being connected at their upper ends by means of a transverse beam or bar 9. At the opposite or front end of the frame is an upwardly-extending bracket 10, and intermediate of said front and rear ends are two upwardly-extending arms 12 and 13. An upright 13ª is also provided at the rear of the frame. These arms, bracket, and uprights support and carry the binding mechanism.

Immediately in front of the elevator 4, and a slight distance below the lower roller 6 thereof, is a rod or bar 14, which extends the entire length of the machine and has its end secured in the elevator-supports 7.

Secured at one end to the arm 12 is a rod or bar 16, similar to rod 14, its opposite end being supported by a cross-bar 43ᶜ of the frame. Connected with these bars 14 and 16 is a series of downwardly-extending inclined slats or bars 17, which slats, in connection with the vertical slats 19, connected with bars 20 and 20ª, and the short slats 22, depending from the forward part of bar 20, form guides or ways which conduct the grain from the elevator to the packing and binding devices, hereinafter described. The bar 20 is supported at its rear end by the transverse bar 9 of the frame and at its front end by an arm 7ª, secured to and projecting from the carrier-frame 7. The lower bar 20ª is supported at its rear end by a standard 13ª, secured to the lower rail of the frame and at its front end by the arm 13 of the packer.

Pivoted to a bar 23, secured to the uprights 8, is a two-armed lever 24, one arm of which is connected by means of a bar 25 with a bell-crank lever 26, secured to an oscillating shaft 27, journaled in beam 23, and an upwardly-extending arm 28, formed with bracket 10, the other arm of said lever 26 being connected by means of rod 29 with a pinion hereinafter described. The opposite end of lever 24 is connected by means of rod 30 with a crank 31, secured to an oscillating bar 32, journaled in said beam 23 and in the lower inclined support 7. These bars 27 and 32 are provided with inwardly-extending slats or fingers 33, which form a cradle to receive the grain from the elevator and hold the same until ready to be delivered to the packer, when by means of the oscillating bars, levers, and other connections, hereinafter described, they are moved downwardly, spreading apart and allowing the grain to be deposited in the packer.

The packer, which receives the grain from the cradle and compacts it into a gavel or sheaf and holds the same during the binding operation, consists of two metallic half rings or sections 34 and 35, pivoted together, the peripheries thereof being smooth or plain, while their interior surfaces are formed with a series of equidistant V-shaped longitudinal grooves 36ª, which receive a portion of the grain comprising the gavel, so that it may be seized by the twister, hereinafter described, and twisted into a binding-rope. These sections where they are connected together are cut away upon opposite sides, forming lugs 37, through which passes a rod 38, which forms the pivot thereof, the lower section 35 being rigidly secured to the arms 12 and 13, while the section 34 is securely fixed to the rod 38. This rod extends to the rear of the apparatus and is journaled in the arm 13ª, where it is provided with a cogged pinion 39, which meshes with a cogged segment 40, fixed to an oscillating rod 41, journaled in one of the uprights 8, and the bracket 10, being also provided with an upwardly-projecting arm 41ª, carrying a roller 41ᵇ at its upper or free end.

Pivoted to a cross-beam 43 at 43ª, which cross-beam is connected with the uprights 8, are two curved arms 44, which carry at their lower ends forwardly-extending rods 45, which extend nearly to the packer. At their upper ends these arms are pivoted to a curved arm 46, pivoted at 46ª to the cross-bar 43 and having at its lower end an extension 47, provided with a slot 48, within which works a stud 49, secured to the segment 40. The rods 45 are provided with inwardly-projecting slats or fingers 44ª, which support the gavel or bundle while being bound and which at the proper time spread apart and allow the gavel to be discharged when the binding operation is completed, as will hereinafter appear.

The driving mechanism by which the various parts of the binding mechanism proper are operated is supported by the bracket 10, which has formed integral therewith or firmly secured thereto a hub 50 and a cogged disk 51. Through this hub passes a short shaft 52, one end of which is provided with a bevel-gear 52ª, meshing with the similar gear 2ᵉ on shaft 2ᵈ. The other end of this shaft carries a large wheel 42, which rotates with the shaft, and is provided on its outer or front face with two outwardly-projecting segmental flanges 53 and 54, the flange 53 being shorter than the one 54, spaces being formed therebetween to receive the gates 56 and 57. The gate 56 is pivoted to the face of wheel 42 intermediate of its ends and tapers to a point at one end, the opposite end being made flaring, as shown in Figs. 3, 4, 5, and 6, and the inner face of said gate being made with a double curve. The enlarged or flaring end is provided upon its outer side with a nose 55, which abuts against a corresponding recess in the end of flange 53, whereby the movement of the gate is limited. The gate 57 is pivoted to wheel 42 at 59 and has its inner and outer faces curved, and the point thereof is adapted to strike against one end of flange 54, which is provided with an inwardly-projecting curved finger or lug 60.

Fixed to a shaft 61, projecting through wheel 42, is a pinion 62, which meshes with the cogged disk 51. Upon the opposite or rear face of said wheel is a housing 63, in which is journaled one end of a shaft 64, which is provided with a pinion 65, meshing with a pinion 66, fixed to the shaft 61. The opposite end of shaft 64 is journaled in a cage 67, in which is journaled a shaft 68 (see Fig. 7) at right angles to shaft 64, provided at its outer end with a bevel-pinion 69, which gears with a corresponding pinion 70 on said shaft 64. This cage is carried by a rigid arm 64$^a$, connected with the housing, and is so constructed and located as to work or run upon the periphery of the packer, being provided with a roller 67$^a$, which runs thereon. At the inner end of this cage is a finger 71, by which the strands are seized and turned outwardly and presented to a twisting device mounted upon the end of shaft 68. This twister consists of a series of curved blades 72, radiating from said shaft, three being shown in this instance, although the number may vary. These blades being fast on shaft 68 rotate therewith and catch the strands as they are successively bent up by the finger 71, twist the same together, and lay them down upon the gavel, forming, as it were, a rope which encircles and binds the bundle or sheaf.

Projecting rearwardly from the movable section of the packer is an extension 73, having a race 74, in which works a tucker, by means of which the last strand caught and turned by the picker-finger is tucked underneath of the strands first twisted. This tucker consists of a metallic bar 75, having a longitudinal groove in its upper side and having its front end outwardly beveled, forming a jaw 76, and provided with upwardly-extending lugs 77, in which is centrally pivoted a curved jaw 78. Connected with the lower end of the pivoted jaw and located in the groove in the tucker-bar is a sliding bar 79, having an upwardly-extending pin 80, which works in a slot 81 in an arm 82, fixed to an upwardly-projecting shaft 83, pivoted in the extension 73. The end of this arm which is secured to said shaft is formed or provided with two notches 84 85, (see Fig. 14,) with which is adapted to engage a pawl 86, having a hooked end 87 pivoted to the extension 73, a spring 88 bearing against the same, so as to force said hook into the notches.

The numeral 89 denotes a curved rod passing through a guide 91 in the movable section of the packer and having its upper end bent at an angle and inserted in an aperture in the pawl 86. The opposite end of rod 89 is bent into hook form and engages with a stud 90 on the stationary section of the packer. A spring 92 on said movable section bears against the rod and holds it in engagement with the stud 90.

The shaft 83 is provided with a coiled spring 93, one end of which is connected with the extension 73, while the other end passes through an aperture in the shaft by which it is held. To the upper end of the shaft is secured a plate 94, having two projecting arms 94$^a$ and 94$^b$, which are adapted to be successively struck by the cage 67 in its movement around the packer, whereby the tucking devices are actuated. The arm 94$^b$ is longer than arm 94$^a$, for a purpose hereinafter explained.

Upon their front faces the two sections of the packer are provided with plates 95, corresponding in shape therewith and having recesses therein with beveled sides 96. These plates are secured to the packer by means of headed screw-bolts 97, passing through slots 97$^a$ therein, by means of which they are adjusted so as to vary the size of the V-shaped grooves in the packer and cause them to take up more or less grain from the gavel, and thus varying the size of the binding-rope.

Secured to the movable section of the packer is an inwardly-projecting arm 98, which acts as a lifter when the section is opened and serves to lift the butt-end of the bound gavel and aid in depositing the same on the ground.

Figure 5:
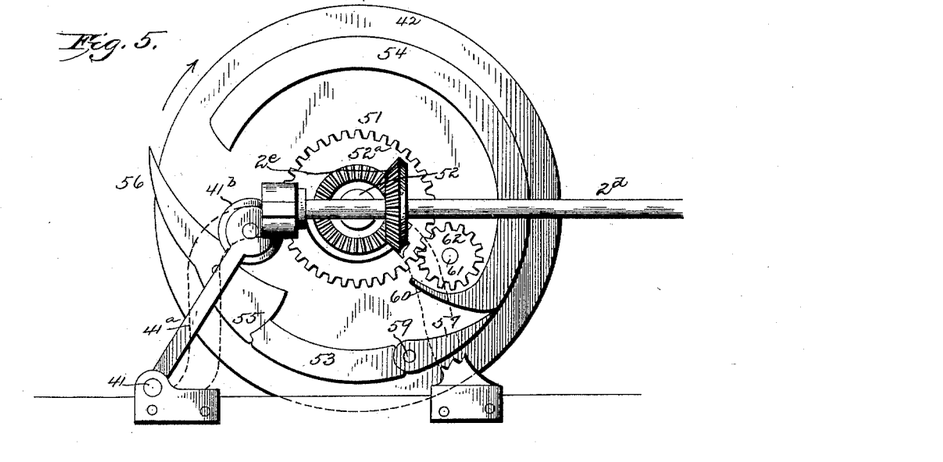

The operation is as follows: Motion is communicated to the wheel 42 from the driving-axle of the reaper through the medium of the sprocket-chains, differential gearing and shafts, and the bevel-pinions 2$^e$ and 52$^a$. Assuming the parts to be in the position shown in Figs. 5 and 12, the packer has just been opened, the arms forming the cradle which receives the grain from the elevator also opened, and the arms which support the grain or gavel in the packer closed, so that the grain from the elevator will be received by the packer and lower closed cradle. The construction and arrangement of the cradles and their connections are such and their movements are so timed that when a sufficient quantity of grain has been received by the packer to form a gavel or sheaf the upper cradle will close. When the gavel has been bound, as hereinafter described, the packer and the lower cradle will open, allowing the bound sheaf to fall to the ground, whereupon said lower cradle will close and the upper one open to again allow the grain to be received by the packer and the lower cradle. The lower cradle assists in supporting the grain in the packer. These operations are caused by the roller 41$^b$ engaging with the inner curved face of the gate 56, whereby the upwardly-projecting arm carrying said roller is turned sidewise, as seen in Fig. 5, oscillating arm 41, and through the medium of the segment 40 and its pinion also oscillating rod 38, which will open the movable section of the packer, so as to receive the gavel. As the wheel continues its movement, the roller will strike the inner face of the extension of the gate, closing the latter, as seen in Fig. 6.

Figure 4:
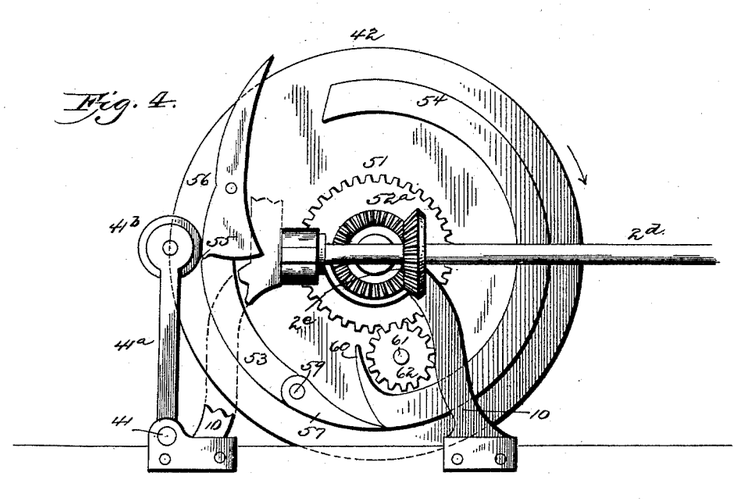
Figures 15, 16, 16A, 16B:
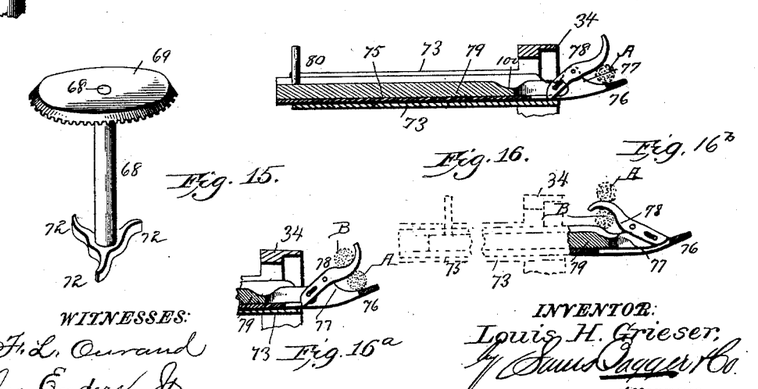
Figure 17:
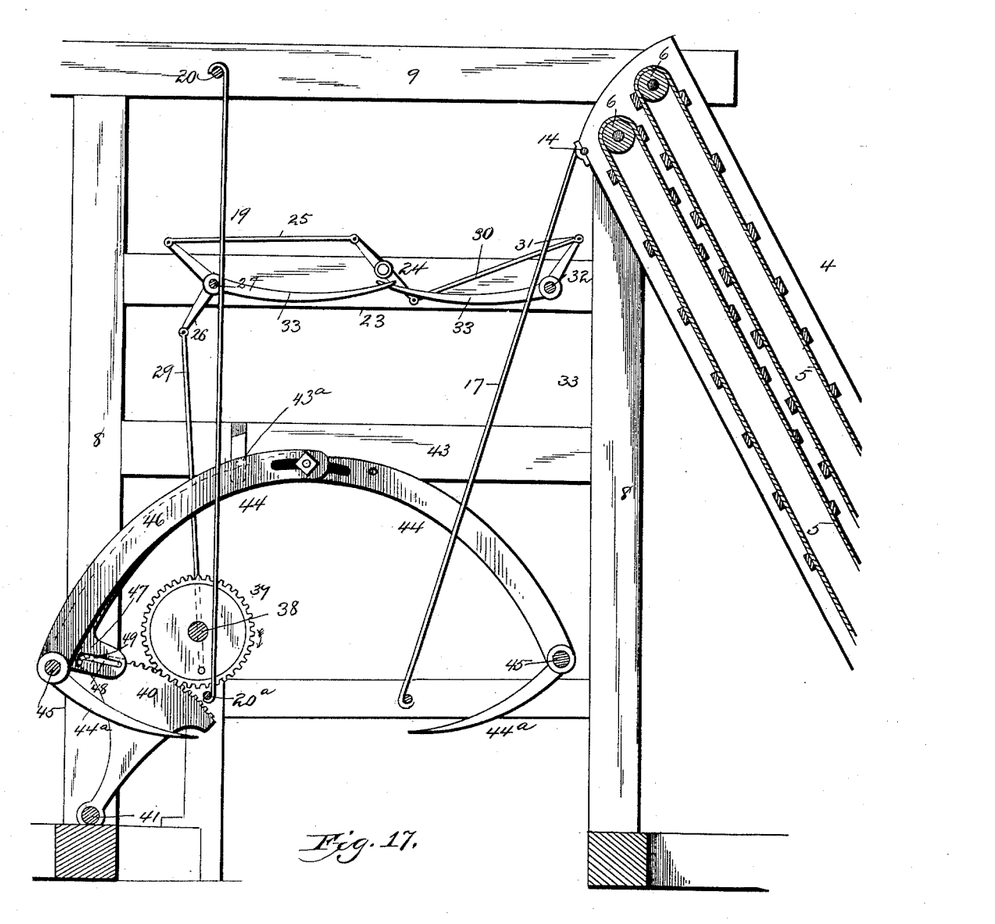
Fig. 17 is a view similar to Fig. 9 with the parts in different positions.
Figure 20:
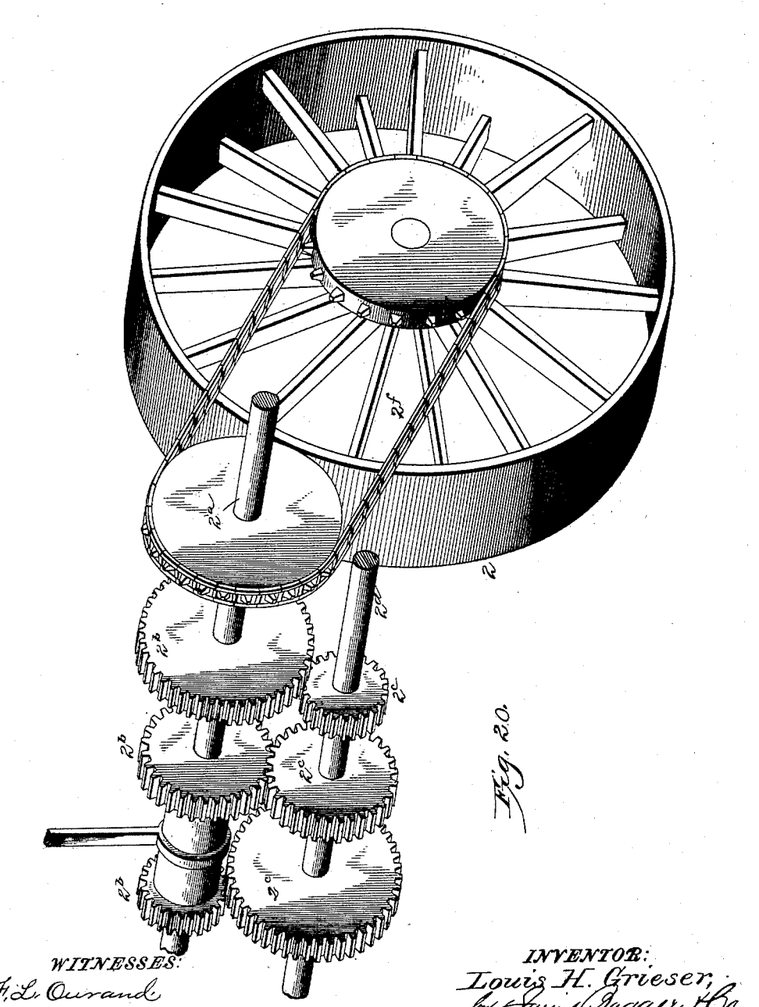
Fig. 20 is a perspective view of the reaper supporting and driving wheel, also showing the differential gearing.

The said roller will then strike the curved lug 60 of the flange 54, whereby it is forced outwardly, causing the arm 41$^a$ to resume its perpendicular position and the rod 38 to be moved in an opposite direction by means of the aforesaid pinion and segment actuating said rod, so as to close the packer and compact the gavel therein, the grain at certain points on the periphery of the gavel entering the V-shaped grooves on the inner surface of the packer. During the revolution of wheel 42 a rotary movement is given to the shaft 64, carrying the cage 67, through the medium of the cogged disk 51, pinion 62, and pinions 65 and 66 on the rear face of the wheel 42. The parts are so adjusted that immediately after the packer closes, as aforesaid, and compacts the gavel therein and in the grooves 36$^a$ the finger on the cage will engage with and catch under the grain in the groove in the movable section nearest the pivotal shaft 38, turning it up, so that it will be caught by the blades of the twister, which is rapidly revolved through the medium of the beveled pinions 69 and 70. As the cage continues its movement, the finger will successively engage with and turn up at right angles the strands of grain in the grooves, which by means of the twister will be woven into the form of a rope and laid around the periphery of the gavel. By the time the first strand is twisted and the twister is far enough advanced to take hold of the second strand the front part of the cage will strike the arm of plate 94, causing the bar 79 to be projected forwardly, the jaws on the end thereof engaging with the twisted strands and forcing the same a short distance away from the face of the packer and holding them between the jaws 76 and 78, the pawl 86 engaging with notches on the arms 82 and preventing backward movement of the tucker. The initial movement of the tucking mechanism, caused by the cage striking the arm 94$^a$, moves the bar 79 forward in the groove or channel of the bar 75 independently of the latter until the parts assume the position shown in Fig. 16$^a$. When this position is reached, the rear end of the jaw 78 strikes the bottom of the race 74 in which the bar 75 slides and is prevented from turning farther until the end of the jaw passes out of the race, which does not occur until the cage strikes the arm 94$^b$ in the next revolution. From the foregoing it will be understood that the movement imparted by the cage striking the arm 94$^a$ first moves the bar 79 forward in the bar 75, turns the jaw far enough to pass over the twisted strand, then moves the two bars 75 79 forward together until the nose 76 of bar 75 passes under the twisted strand, as represented in Fig. 16, and leaves the parts in such position that on the next revolution the last strand will be laid over the jaw 78, as shown in Fig. 16$^a$. The cage then strikes the arm 94$^b$, whereby a further movement is imparted to tuck the last strand under the first. During this second movement the bars 75 79 again move forward together until the rear end of the jaw 78 passes out of the race 73, when the bar 75 stops and the bar 79 moves forward independently, whereby the jaw 78 is turned into the position shown in Fig. 16$^b$, carrying with it the last-twisted strand (marked B) and clamping it in the notch 100. When the limit of independent movement is reached by the bar 79, (which limit is determined by the pivotal connection between the two bars and the jaw 78,) the two bars again move forward together until the strand B is passed under the first-twisted strand, (marked A,) when the tucking operation is completed. The parts are now released and returned to their normal positions, as will be hereinafter explained. The initial return movement draws the bar 79 back to the full limit of its independent movement into the bar 75, turning the jaw 78 forward, after which the two bars move back together into their retracted position. As the wheel 42 continues its revolution, the gate will again come to its first position; but owing to its having been closed by the roller 41$^b$ striking its extension the arm carrying the same will not be actuated, as the roller will pass by the gate without engaging therewith, as will appear from Fig. 3, and the packer will remain closed. As the wheel continues its movement, the roller will strike the outer face of the extension of the gate, opening the same, as seen in Fig. 4, so that on the revolution the roller will engage with the gate to open the packer and allow the bound gavel to fall to the ground. As the cage approaches the point at which it started, the finger will catch the strands in the last grooves of the packer and the twister will bend them down between the pivoted jaw 78 of the tucker and the front face of the packer, as seen at B, Fig. 16$^a$, the jaw 76 having been forced outward from the face of the packer by the rod 79, as before stated, so that said pivoted jaw will lie in the path of said last-twisted strands, which will thus be deposited in said jaw. When the cage has passed to the position shown in Fig. 12, the packer in opening will cause the pawl to be disengaged from the notches on the shaft 83 by means of the rod 89, when the coiled spring 93 will return the two-armed plate and the tucker to their normal positions. The hook on the free end of rod 89 is so shaped (see Fig. 14) that it may ride over the pin 90 in either direction. The spring 92 is stronger than the spring 88, being strong enough to hold the hook of rod 89 in engagement with the pin 90 until the pawl 86 is drawn out and disengaged from the notch in the hub of arm 82, when the latter will immediately return to its normal position under the action of spring 93. From this it will be understood that the tucking mechanism is released and returned to its normal position at the beginning of the opening movement of the packer and before the rod 89 is disengaged from the pin 90. The continued movement of the upper section of the packer then disengages the rod 89 from the pin 90, whereby the pawl 86 is also released and permitted to resume its normal position under the action of its spring 88. When the packer is again closed, the hooked end of rod 89 will snap over the pin 90 and the parts will all be in position ready for the next operation.

From the above it will be seen that the cut grain is fed to the packer with the butt-ends pointing to the front of the binder and with certain of the strands lying in the grooves in the packer. The finger of the cage running upon one side of the packer near the periphery will then catch underneath the strands in the grooves, turning them outwardly and presenting them to the twister, which will twist and lay the same down upon the periphery of the gavel at right angles to the length thereof, weaving them into a rope, and finally by means of the tucker tucking the ends of the last strands caught by the finger under the first-twisted strands, thereby firmly and securely binding the gavel. The gavel is then discharged from the packer and the device ready for a repetition of the operation.

Having thus described my invention, what I claim is—

1. The method herein described of binding grain, which consists in compressing a gavel unequally at intervals, thereby segregating strands or portions thereof, then successively separating such segregated strands or portions and twisting them into a band, and finally tucking the free end of said band under the strands first twisted, substantially as set forth.

2. In a grain-binder, the combination, with the revoluble wheel having the segmental flanges on its outer face with spaces between the ends thereof, of the gates pivoted to said wheel, the inwardly-projecting curved lug, the upright arm having a roller, the oscillating rod to which said arm is secured, and the packer connected with said oscillating rod, substantially as described.

3. In a grain-binder, the combination of the wheel having segmental flanges on its outer face, the gates pivoted to said wheel, the inwardly-extending curved lug formed with or secured to one of said flanges, the upright having a roller at its upper end, the oscillating bar or rod to which said arm is secured, the segment and pinion, the bar or rod to which said pinion is secured, and the two-part packer, substantially as described.

4. In a grain-binder, the combination, with the wheel having segmental flanges on its outer face, of the gates pivoted to said wheel, the inwardly-extending curved lug formed with or secured to one of said flanges, the upright arm having a roller at its upper end, the oscillating bar or rod to which said arm is secured, the segment and pinion, the bar or rod to which said pinion is secured, and the two-part pivoted packer having V-shaped longitudinal grooves on its inner surface, substantially as described.

5. In a grain-binder, the combination, with the two-part packer having longitudinal V-shaped grooves and means, substantially as described, for actuating the same, of the wheel having a beveled pinion and the hub having a cogged disk, the pinion journaled in front face of said wheel and meshing with said disk, the shaft connected with said pinion and rotated thereby, the cage carried by said shaft, provided with a finger, and a revolving shaft having a series of curved twisting-blades, substantially as set forth.

6. In a grain-binder, the combination, with the two-part packer and the driving-wheel provided with a rotating shaft, of the cage carried by said shaft, having the finger, the revolving shaft, the pinions connected with said shafts, the curved twisting-blades, and the roller adapted to run on the periphery of the packer, substantially as described.

7. In a grain-binder, the combination, with the cage having the finger and revolving twister, of the two-part packer having longitudinal V-shaped grooves on its inner surface and a reciprocating tucker, substantially as described.

8. In a grain-binder, the combination, with the cage having a finger and a revolving twister, of the two-part packer having longitudinal V-shaped grooves on its inner surface, the reciprocating tucker working in a race in an extension of the packer and having its end beveled, forming a jaw, and a jaw pivoted to said tucker and connected with said pivoted jaw, substantially as described.

9. In a grain-binder, the combination, with the cage having the finger and revolving twister, of the reciprocating tucker working in a race in an extension of the packer and having its front end beveled, forming a jaw, with a groove in its upper side, the jaw pivoted in lugs on said tucker, and the arm connected with said jaw and working in the aforesaid groove, substantially as described.

10. In a grain-binder, the combination, with the cage having the finger and revolving twister, of the two-part packer, the reciprocating tucker working in a race in an extension of the packer and having its front end beveled, forming a jaw, with a groove in its upper side, the jaw pivoted in lugs on said tucker, a bar or rod connected with said pivoted jaw and working in said groove, a pin or stud on the said rod, a plate having a slot through which said stud projects, a shaft journaled on the said extension of the packer, and a two-armed plate adapted to be struck by the cage in its movement and actuate the tucker, substantially as described.

11. In a grain-binder, the combination, with the cage having the finger and revolving twister, of the two-part packer, the reciprocating tucker working in a race in an extension of the packer and having its front end beveled, forming a jaw, with a groove in its upper side, the jaw pivoted in lugs on said tucker, a rod connected with said pivoted jaw and working in said grooves, a pin or stud on the said rod, an arm having a slot through which said stud passes and at its other end provided with notches, a shaft journaled in the said extension of the packer, the two-armed plate secured to said shaft, a pivoted spring-pawl adapted to engage with said notches, and a spring-rod connected at one end with said pawl and having its other end formed into a hook and engaging with a stud on the other section of the packer, substantially as described.

12. In a grain-binder, the combination, with the packer made in two sections and pivoted together and provided with a series of V-shaped grooves on its inner surface, of the adjustable segmental plates connected with said sections and provided with recesses having beveled sides, whereby the sides of said groove may be varied, substantially as described.

13. In a grain-binder, the combination, with the binder-driving wheel having segmental flanges and pivoted gates and an inwardly-projecting lug or finger, of the oscillating bar having an upright carrying a roller, the segment mounted on the other end of said shaft having a projecting pin, the curved arm having an extension and slot in which said stud works, and the pivoted curved arm connected with said arm and having longitudinally-extending bars provided with inwardly-projecting slats, substantially as described.

14. In a grain-binder, the combination, with the binder-driving wheel having segmental flanges on its outer face, pivoted gates, and an inwardly-projecting lug or finger, of the oscillating shaft having an upwardly-extending arm provided with a roller, a segment secured to the opposite end of said shaft, the pinion meshing with said segment, the rod connected with said pinion, the bell-crank lever and shaft connected therewith, the pivoted lever, the shaft having a crank, the rods connecting said lever and cranks, and the inwardly-extending fingers or slats secured to said shafts, substantially as described.

15. In a grain-binder, the combination, with the oscillating shaft having a segment at one end provided with a stud, the pinion meshing with said segment, a rod connected with said pinion, a bell-crank lever and shaft connected therewith, the pivoted lever, the shaft having a crank, the rods connecting said lever and cranks, and the inwardly-extending fingers or slats secured to said shafts, of the pivoted arms having longitudinal bars with inwardly-extending fingers or slats, and the curved arm pivoted to said arms and having a slotted extension in which the pin or stud on the segment works, substantially as described.

In testimony that I claim the foregoing as my own I have hereunto affixed my signature in presence of two witnesses.

LOUIS H. GRIESER.

Witnesses:
ARTHUR B. SEIBOLD,
BENNETT S. JONES.